Figure 3:
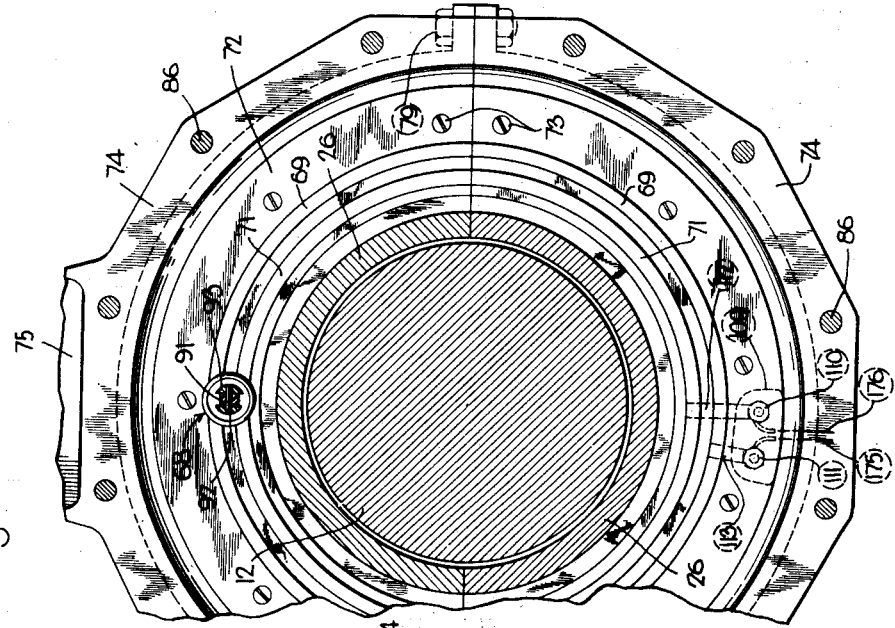

April 23, 1940.     C. C. FARMER     2,198,034
INERTIA TYPE BRAKE CONTROLLER
Filed Aug. 6, 1938     2 Sheets-Sheet 1
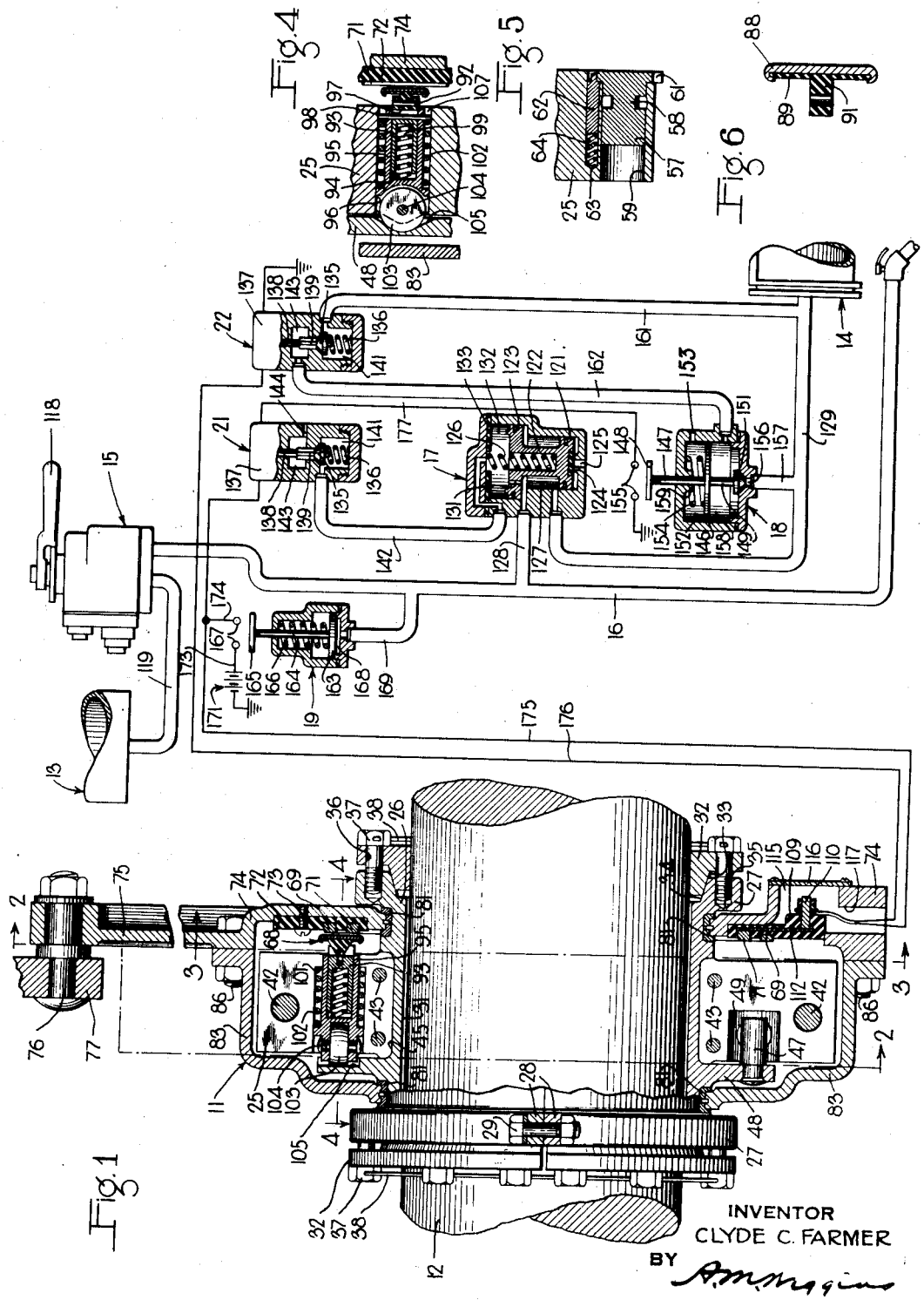
INVENTOR
CLYDE C. FARMER
BY
*A. M. Maggins*
ATTORNEY April 23, 1940.  C. C. FARMER  2,198,034
INERTIA TYPE BRAKE CONTROLLER
Filed Aug. 6, 1938  2 Sheets-Sheet 2

INVENTOR
CLYDE C. FARMER
BY
ATTORNEY

Patented Apr. 23, 1940

2,198,034

UNITED STATES PATENT OFFICE 2,198,034

INERTIA TYPE BRAKE CONTROLLER

Clyde C. Farmer, Pittsburgh, Pa., assignor to The Westinghouse Air Brake Company, Wilmerding, Pa., a corporation of Pennsylvania Application August 6, 1938, Serial No. 223,377

11 Claims. (Cl. 200—52)

This invention relates to inertia type brake controllers and particularly inertia brake controllers of the rotary type operatively associated with an individual vehicle wheel or wheel-axle, for automatically effecting release of the brakes on the wheel or axle on an excessive rate of rotative deceleration thereof, as when slipping, for the purpose of guarding against and preventing sliding of the vehicle wheels.

It should be understood at the outset that the term "slip" or "slipping", as employed herein, refers to the rotation of the vehicle wheels or axles at a speed less than a speed corresponding to vehicle or rail speed at the same instant, whether the wheel or axle is decelerating or accelerating in speed, and that the term "slide" or "sliding", as employed herein, designates the dragging of the vehicle wheels along the associated rail or road surface in a locked or non-rotative state.

As is well known, the application of the brakes to a vehicle or car wheel to a sufficient degree to exceed the limit of adhesion between the tread surface of the wheel and the rail or road surface causes the wheel to decelerate rapidly, that is slip toward a locked or non-rotative condition. If the degree of application of the brakes is rapidly and sufficiently reduced at the instant that slipping of the vehicle wheel begins, the slipping wheel ceases to decelerate and begins to accelerate back toward a speed corresponding to vehicle or rail speed without decelerating completely to a locked or non-rotative state.

Various devices have been proposed which respond instantly to the excessive rate of rotative deceleration of the vehicle wheel or axle, while slipping, for effecting the release of the brakes on a slipping wheel. One such device is described and claimed in Patent 2,068,370 to Rankin J. Bush and comprises essentially a rotary inertia element or fly-wheel operatively associated with and driven through a resilient yielding connection by a rotary element, such as a shaft, driven according to the speed of the vehicle wheels or axle, the relative movement between the inertia element and the rotary element produced by an excessive rate of deceleration or acceleration of the vehicle wheels and the cessation thereof in slipping being employed to automatically effect release and reapplication of the brakes.

It is an object of my present invention to provide a rotary inertia device of novel construction and arrangement of parts adapted to be responsive to the rate of deceleration or acceleration of a rotating element.

More specifically it is an object of my invention to provide a rotary inertia device of novel construction arranged in a novel manner in association with the axle of a car wheel.

Another object of my invention is to provide a rotary inertia device, of the character indicated in the foregoing objects, adapted to function in a brake control equipment to prevent the sliding of the wheels upon application of the brakes.

Figure 2:
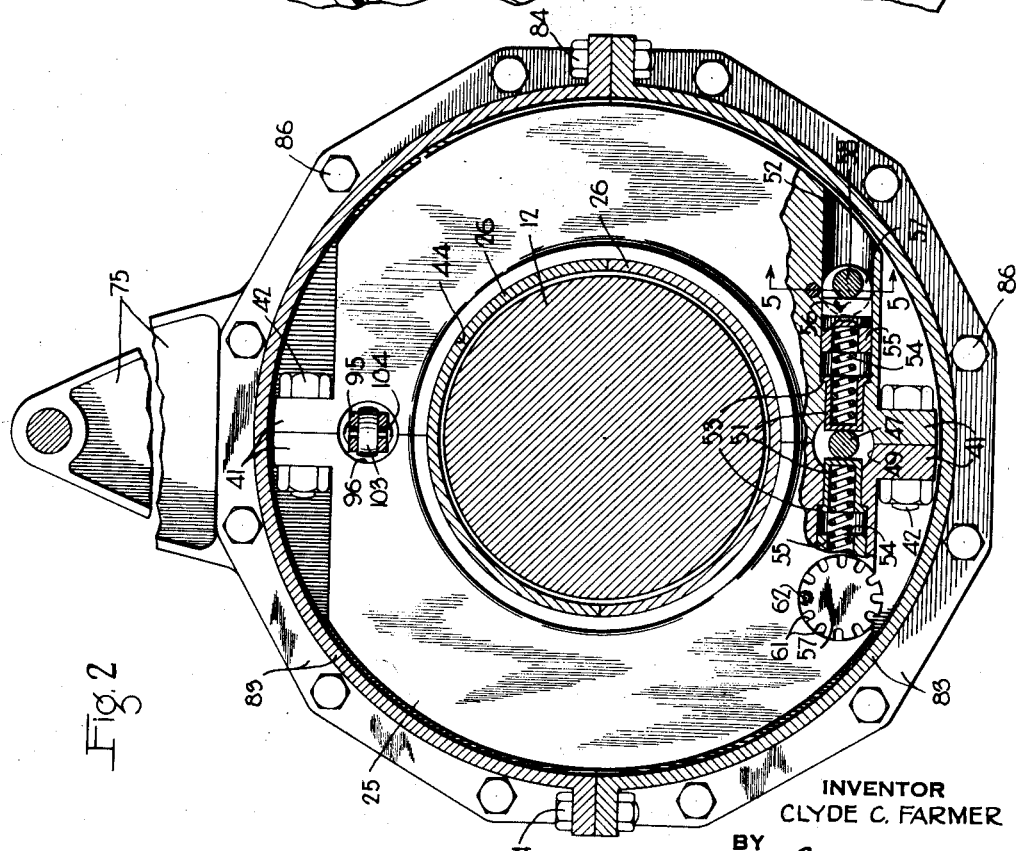

The above objects, and other objects of my invention which will be made apparent hereinafter, are obtained by means of an illustrative embodiment of my invention subsequently to be described and shown in the accompanying drawings, wherein Fig. 1 is a diagrammatic view showing a vertical sectional view of my improved rotary inertia device together with a simplified representation of a brake control equipment with which it is adapted to function, Figs. 2, 3 and 4 are sectional views, taken on lines 2—2, 3—3 and 4—4, respectively, of Fig. 1, Fig. 5 is a fragmental sectional view taken on the line 5—5 of Fig. 2, and Fig. 6 is an enlarged view, showing in detail the construction of the contact shoe shown in Figs. 1 and 4.

Description of equipment

Referring to Fig. 1 of the drawings, the equipment shown comprises a rotary inertia device 11 embodying my invention associated with a car wheel-axle 12 and illustrated in connection with a fluid pressure brake equipment of the type described and claimed in my prior co-pending application, Serial No. 209,648, filed May 24, 1938. The brake equipment includes a source of fluid under pressure, such as a supply reservoir 13, one or more brake cylinders 14 for operating the brakes associated with the car wheels fixed to the axle 12, a manually operated self-lapping brake valve 15, a straight-air pipe 16 the pressure in which is controlled by the brake valve 15 and which extends throughout all cars of a train, a release and reapplication valve device 17 hereinafter called the release valve device, a pressure operated valve and switch device 18 hereinafter called a pressure switch, a pressure switch 19, a magnet valve device 21 controlled jointly by the pressure switches 18 and 19 for controlling the release valve device 17, and a magnet valve device 22 controlled by the pressure switch 19 and the rotary inertia device 11 for effecting operation of pressure switch 18.

Considering the parts of the equipment in greater detail, the rotary inertia device 11 comprises, as shown in Fig. 1, a rotary inertia element in the form of an annular fly-wheel 25 disposed in concentric relation to and rotatively supported on a bearing sleeve 26 of suitable metallic material which, in turn, concentrically surrounds and is fixed to the axle 12 as at a point between the car wheels.

The sleeve 26 is divided longitudinally into two duplicate portions that are secured together as by bolts 29 extending through cooperating perforated lugs 28 on flanges 27 at opposite ends of the sleeve. A circular opening 31 is formed in the sleeve 26 when the two portions of the sleeve 26 are bolted together, the opening 31 being slightly larger in diameter than the diameter of the axle 12, which extends therethrough, to provide clearance sufficient to adjust the sleeve 26 into perfect coaxial relation with the axle 12.

The sleeve 26 is adjusted into perfect coaxial relation with the axle 12 by means of two split adjusting rings 32 located at opposite ends of the sleeve respectively, each ring 32 having a tapered shoulder 33 for engaging in a correspondingly tapered counterbore 34 in the flange 27 at the associated end of the sleeve. The end faces of the flanges 27 are provided with suitable tapped holes 35 and the adjusting rings 32 are provided with suitable holes 36, registering with each other and spaced circumferentially for receiving adjusting screws 37. Any suitable means may be provided for locking the adjusting screws 37 in position once the sleeve 26 is adjusted in coaxial alignment with the axle 12, such as a locking wire 38 which extends serially through openings in the heads of the adjusting screws 37.

As seen in Figs. 1 and 2, the fly-wheel 25 is divided into similar half-portions having cooperating perforated lugs 41 at diametrically opposite points for receiving bolts 42 adapted to secure the two half-portions together around the bearing sleeve 26. The contacting faces of the two half-portions of the fly-wheel are provided with suitable holes which register exactly and contain therein dowel pins 43 for maintaining the two half-portions of the fly-wheel in proper alignment so that the central opening 44 formed in the fly-wheel is always a perfect circle.

The bearing sleeve 26 is provided on the outer surface thereof with an annular channel or groove 45 in which the fly-wheel 25 fits closely for preventing relative axial movement between the fly-wheel 25 and the sleeve 26.

Since the fly-wheel 25 is arranged, as hereinafter described, for limited rotative movement relative to the sleeve 26, a special bearing bushing or sleeve is not provided in the central opening 44 of the fly-wheel, though such bushing or sleeve may be provided, if desired.

The fly-wheel 25 is connected to the sleeve 26 through a resilient yielding connection which is obtained by providing a pin 47, secured as by riveting to a flange 48 on the sleeve 26, which extends parallel to the axle 12 into a bore 49 provided in the fly-wheel, the pin 47 being centered normally in the bore 49 by means of two spring-biased stops 51 respectively engaging opposite sides of the pin and contained in a chordal bore 52 in the fly-wheel which intersects the bore 49.

The bore 52 is of smaller diameter at the mid-portion thereof as compared to the outer ends thereof (see Fig. 2), thus providing a stop-shoulder 53 on each side of bore 49 adapted to be engaged by a flange on the corresponding stop 51 for so limiting the movement of the corresponding stop 51 inwardly of the bore 52 that the distance between the inner ends of the two stops 51 normally closely conforms to the diameter of the pin 47, thereby preventing any loose movement between the fly-wheel 25 and the sleeve 26.

Each stop 51 is biased inwardly of the bore 52 to its innermost position by a coil spring 54 located between the stop and a cam follower 55, in the form of a piston, that operates in the outer portion of the bore 52. A tongue 56 is provided on the outer face of each cam follower 55, which tongue extends into an annular groove in a rotary cam element 57 and engages a circular cam portion 58 eccentrically arranged on the cam element 57.

The cam element 57 rotates in a suitable bore 59 which intersects the bore 52 and is provided on one end thereof with a flange in the periphery of which is formed a series of uniformly spaced notches 61. A locking pin 62 (see Fig. 5) is received in a bore 63 provided in the fly-wheel 25 in close parallel relation to bore 59 and is biased outwardly of the bore by a spring 64 interposed between the inner end of the bore and the inner end of the pin 62 to cause the outer reduced end of the pin to engage in any one of the notches 61 to lock the cam element 57 in a desired rotary position.

It will be apparent that the cam element 57 may be unlocked by pressing the locking pin 62 inwardly to clear the flange at the outer end of the cam element.

In the position of the cam element 57, shown in Fig. 2, each cam follower 55 is permitted to move outwardly of the bore 52 to a maximum degree thus relaxing the tension of the associated spring 54 to a maximum degree. In order to increase the tension of the spring 54, the rotary cam element 57 is unlocked by depressing the locking pin 62 and then rotating the cam element in either a counterclockwise or clockwise direction. Due to the shifting of the eccentrically disposed cam portion 58 of the cam element inwardly of the bore 52 incidental to such rotation of the cam element, the cam follower 55 is shifted inwardly of the bore 52 to increase the tension of the spring 54. When a desired tension is attained, the locking pin is released and engages in a corresponding notch 61 to hold the cam element 57 in position.

The tension of the springs 54 is so adjusted that unless the vehicle wheels and therefore the axle 12, decelerates or accelerates rotatively in excess of a certain rate, the torque force exerted by the pin 47 on the flange of the sleeve 26 against either of the stops 51 is ineffective to overcome the spring 54 and permit relative rotative movement between the fly-wheel and the sleeve 26. When the rotary inertia device 11 is provided in connection with a brake control equipment, the springs 54 for the stops 51 are so tensioned as to prevent relative rotative movement between the fly-wheel 25 and sleeve 26 except when the axle 12 decelerates or accelerates in excess of a rate occurring only when the vehicle wheels slip. If the car carrying the rotary inertia device 11 is employed in duodirectional service so that the vehicle wheels rotate in one direction when the car travels in a forward direction in one instance and rotate in the opposite direction when the car travels in a forward direction in another instance, both of the adjusting springs 54 are preferably adjusted to a uniform tension so that the fly-wheel 25 may shift rotatively relative to the sleeve 26 at all times only when the rate of deceleration of the wheels and axle 12 exceeds a certain uniform rate. If the car is of the articulated type so that the car wheels always rotate in a given direction for forward motion of the car, the tension of the biasing springs 54 on opposite sides of the pin 47, may be adjusted to different degrees of tension, since in such case one stop 51 always acts to yieldingly resist relative rotative movement between the fly-wheel and the sleeve 26 during deceleration of the axle 12 and the other stop 51 always acts to yieldingly resist relative rotative movement between the fly-wheel 25 and the sleeve 26 during acceleration of the axle.

According to my invention, a contact shoe 68 is carried by the fly-wheel 25 and is arranged to be shifted in response to relative rotary movement between the fly-wheel 25 and sleeve 26 into bridging contact with two circular contact or slip rings 69 and 71 (see Figs. 1 and 3) inset in spaced concentric relation in an annular insulating member 72 secured as by a plurality of screws 73 to an annular end plate 74 or disc constituting a part of the casing of the rotary inertia device. The end plate 74 is provided with an extension 75, hereinafter referred to as the torque arm, which is secured as by a bolt 76 to a fixed part of the car wheel truck. The end plate 74 is divided into two portions adapted to be secured together, as by bolts 79, after the two portions are assembled in surrounding relation to the sleeve 26. An annular bushing 81, of suitable bearing material, is inset in the outer surface of the sleeve 26, with which bushing the surface at the central opening formed in the end plate 74 rotatively cooperates.

As shown in Fig. 3, the annular insulating member 72 and the slip rings 69 and 71 are each divided into two semi-circular portions which cooperate to form complete rings when the two portions of the end plate 74, to which they are secured, are bolted together around the axle 12.

A cover section 83 of the casing of the rotary inertia device is provided having two semi-circular portions adapted to be assembled around the axle 12 and fly-wheel 25 and bolted together by suitable bolts 84, and is suitably secured to the end plate 74 as by a plurality of circumferentially spaced bolts 86 whereby to completely enclose the fly-wheel. A suitable annular bushing of bearing material 81 is also provided on the outer surface of the sleeve 26 for rotative engagement by the surface of the cover section 83 at the central opening formed therein.

As seen in Figs. 3, 4 and 6, the contact shoe 68 comprises a circular metallic disc 88, the edges of which are bent in securing relation around a disc 89 of insulating material having a perforated lug 91 formed thereon. The contact shoe 68 is pivotally mounted on a pin 92 carried by a plunger 93 which operates slidably in a suitable bore 94 formed in another plunger 95 which operates slidably in a bore 96 in the fly-wheel 25. The plunger 93 is provided with a slot 97 extending diametrically therethrough for receiving a pin 98, the opposite ends of which extend in fixed relation through the wall of the tubular plunger 95 and into guiding slots 107 or grooves in the fly-wheel 25. A coil spring 99 is interposed in the bore 94 between plunger 95 and the inner end of the plunger 93 to bias the plunger 93 and the contact shoe 68 outwardly of the bore 94 to a limit position determined by the engagement of the pin 98 with the inner end of the slot 97.

The bore 96 in the fly-wheel 25 is formed with a shoulder 101 therein, and a coil spring 102, contained in the bore 96 in concentric relation to the tubular plunger 95, is interposed between the shoulder 101 and a flange on the tubular plunger 95 for urging the plunger 95 in a direction to shift the plunger 93 and contact shoe 68 away from and normally out of contact with the slip rings 69 and 71.

The end of the tubular plunger 95 opposite the contact shoe 68 is bifurcated and a suitable roller 103 is supported, as by a pin or rivet 104, between the prongs of the bifurcated portion, the roller 103 being oriented in a plane tangential to the axle 12 and held against movement out of such plane by the cooperation of the pin 98 and slots 107 in the fly-wheel which prevents turning of the plunger 95 in the bore 96.

The flange 48 of the sleeve 26 is provided, at a point diametrically opposite to the torque pin 47, with a shallow V-shaped recess 105 in the face thereof adjacent the fly-wheel, into which recess the roller 103 is urged by the spring 102. With the fly-wheel 25 and sleeve 26 in their normal position relative to each other, as determined by the spring-biased stops 51, the roller 103 extends into the deepest portion of the recess 105.

When the fly-wheel 25 shifts rotatively relative to the sleeve 26, the roller 103 rides up either one or the other sloping sides of the recess 105 toward the face of the flange 48 and plunger 95 is thus urged in a direction parallel to the axis of the axle 12 to effect movement of the plunger 93 carrying contact shoe 68, so as to cause contact shoe 68 to engage the slip rings 69 and 71. The degree of relative rotative movement between the fly-wheel 25 and the sleeve 26 is limited by the engagement of the torque pin 47 with the fly-wheel 25 in the opening or bore 49 so that, preferably, the roller 25 does not at any time leave the recess 105. It will be observed that the spring 99, interposed between the plunger 93 and the tubular plunger 95 provides a cushioned or yielding engagement of the contact shoe 68 with the slip rings 69 and 71 to prevent excessive wear of the shoe and slip rings. The pivotal connection of the contact shoe 68 to the plunger 93 permits proper seating of the contact disc 88 on both slip rings 69 and 71 even though the two rings should wear unevenly.

Since the relative rotative movement between the fly-wheel 25 and sleeve 26 is critical and takes place suddenly due to the adjustment of the biasing spring 54 for the stop members 51, the contact shoe 68 is snapped into and out of contact with the slip rings 69 and 71 and thus arcing between the contact shoe and slip rings is minimized.

As shown in Figs. 1 and 3, the insulating ring 72, carrying the slip rings 69 and 71, is provided at the lower portion thereof with a raised portion or boss 109 in which are fixed suitable terminal posts or bolts 110 and 111 that are connected by suitable straps 112 and 113, embedded in the insulating ring 72, to the slip rings 71 and 69 respectively. The end plate 74 has a suitable chamber 115 into which the terminal posts 110 and 111 extend, the chamber 115 being open at the outer face of the end plate to provide access to the terminal posts for securing electrical wires thereto. A suitable removable cover 116 may be provided for closing the chamber 115 when the electrical wires have been connected to the terminal posts. Entry for electrical wires into the chamber 115 is provided through a passage or port 117 which opens radially downward out of the chamber 115.

For simplicity, the embodiment of the rotary inertia device 11 just described and shown in the drawings is adapted to provide, in effect, only a single switch. It will be seen, however, that additional rings similar to slip rings 69 and 71 or additional contact shoes similar to the contact shoe 68 may be provided, whereby a plurality of separate switch devices may be available.

The rotary inertia device 11 is adapted to function in various types of indicating or control systems but for purposes of illustration, it has been indicated as employed in connection with the brake control system previously briefly described. In order, therefore, to understand the character of the operation of the rotary inertia device 11 in connection with a brake control equipment, the parts of the brake control equipment and their operation will now be described in greater detail.

The self-lapping brake valve 15 is of the type described and claimed in Patent 2,042,112 of Ewing K. Lynn and Rankin J. Bush. Since reference may be had to the above-mentioned patent for the details of construction of the brake valve device 15, it is deemed sufficient for the purposes of the present application to merely describe in a general way the functions of the brake valve 15. With the operating handle 118 of the brake valve 15 in its normal or brake release position, the straight-air pipe 16 is vented to atmosphere at the brake valve. When the brake valve handle 118 is shifted in a horizontal plane out of its normal release position into an application zone, the brake valve 15 establishes communication from a supply pipe 119, connected to the supply reservoir 13, to the straight-air pipe 16, thus causing fluid under pressure to be supplied from the reservoir 13 to the straight-air pipe 16. The brake valve 15 is automatically self-lapping to cut off the further supply of fluid under pressure to the straight-air pipe 16 when the pressure established in the straight-air pipe corresponds substantially to the degree of displacement of the brake valve handle into the application zone out of its normal release position. Thus, by varying the degree of displacement of the brake valve handle 118 out of its normal position, varying degrees of pressure are established in the straight-air pipe 16. If, for some reason, such as leakage, the pressure in the straight-air pipe 16 tends to reduce from a pressure corresponding to the position of the brake valve handle 118, the brake valve 15 operates automatically to supply fluid under pressure to the straight-air pipe to maintain such pressure therein. This pressure maintaining feature of the brake valve 15 is of importance and will be referred to hereinafter in connection with reapplication of the brakes following slipping of the vehicle wheels.

The release valve device 17 comprises a suitable casing containing a piston valve 121, hereinafter called the vent valve, which is connected by a tubular stem 122 to an annular piston 123. Normally, the piston 123 is urged by a coil spring 126 in a direction to seat the vent valve 121 on an annular rib seat 124 to close an exhaust port 125 and establish connection, through the annular chamber 127 formed in surrounding relation to the stem 122 between the piston 123 and the vent valve 121, from a branch pipe 128 of the straight-air pipe 16 to a pipe 129 leading to the brake cylinder 14 and hereinafter called the brake cylinder pipe.

The piston 123 is provided with a restricted port 131 through which fluid under pressure may flow from the annular chamber 127 to a chamber 132 formed in the casing at the upper side of the piston 123.

The spring 126 is of such strength and the flow area of the restricted port 131 is such that when fluid under pressure is supplied into the straight-air pipe and through the branch pipe 128, annular chamber 127 and brake cylinder pipe 129 to the brake cylinder 14, the chamber 132 is charged sufficiently rapidly with fluid under pressure that a differential fluid pressure force sufficient to urge the piston upwardly against the force of the spring 126 is not developed.

When the piston 123 is subject to the pressure of fluid in the chambers 127 and 132 on opposite sides thereof and the pressure in the chamber 132 is suddenly and rapidly reduced, the differential fluid pressure force created on the piston shifts the piston 123 upwardly into seated relation on a gasket seat 133 supported on the casing and thereby shifts the vent valve 121 to a position interrupting the connection between the branch pipe 128 and brake cylinder pipe 129. In such position of the vent valve 121, the supply of fluid under pressure from the straight air-pipe 16 to the brake cylinder 14 is cut off and the brake cylinder pipe 129 is vented to atmosphere through the exhaust port 125. When the piston 125 is seated on the gasket seat 133, fluid under pressure continues to leak through the restricted port 131 in the piston to the chamber 132. Due to the pressure maintaining operation of the brake valve 15, the pressure in the straight-air pipe 16 is not reduced because of such leakage through the restricted port 131 in the piston 123.

The sudden rapid reduction of the pressure in the piston chamber 132 of the release valve device 17 is effected under the control of magnet valve device 21 which controls an exhaust communication out of the chamber 132. Magnet valve 21 comprises a suitable casing containing a valve 135 of the poppet type which is normally urged to seated relation on an associated valve seat by a coil spring 136, interposed between the valve and the casing. Valve 135 is unseated upon energization of an electromagnet winding or solenoid 137 which exerts a magnetic force on a plunger 138 that, in turn, contacts the end of the fluted stem 139 of the valve 135. Valve 135 is contained in a chamber 141 which is constantly connected through a pipe and passage 142 to the piston chamber 132 of the release valve device 17 and the fluted stem of the valve extends into a chamber 143 which is constantly open to atmosphere through a port 144.

It will thus be seen that when the electromagnet winding 137 of the magnet valve device 21 is energized, the valve 135 is unseated to establish communication through which fluid under pressure is vented from the piston chamber 132 of the release valve device 17 and that when the electromagnet winding 137 is deenergized, the valve 135 is seated to close such communication.

Energization and deenergization of the electromagnet winding 137 of the magnet valve device 121 is controlled jointly by the series-connected pressure switches 18 and 19. The pressure switch 18 comprises a suitable casing containing a loose-fitting piston 146 having on one side thereof a stem 147, on which is fixed in insulated relation a switch member 148, and having on the opposite side thereof a stem 149 on which is fixed or formed a valve 151 of the poppet type. Formed in the casing at the upper side of the piston 146 is a chamber 152 which is constantly open to atmosphere through a vent port 153. Contained in the chamber 152 in interposed relation between the casing and the piston 146 is a coil spring 154 which yieldingly urges the piston 146 in a direction to seat the valve 151 on its associated valve seat, in which position of the piston the switch member 148 is disengaged from a pair of associated spaced contact fingers 155 stationarily fixed in insulated relation to the casing in manner not shown.

The valve 151 controls communication through a port 156 and branch pipe 157 connecting the chamber 158 at the lower side of the piston 146 to the brake cylinder pipe 129. The valve 151 is relatively small and the inner seated area thereof subject to the pressure in the brake cylinder pipe is such in relation to the strength of the spring 154 that, normally, spring 154 is effective to maintain the valve 151 seated on its associated valve seat to close communication between chamber 158 and brake cylinder pipe against the maximum pressure which may be established in the brake cylinder pipe. The piston 146 is relatively large in area compared to the area of the valve 151 subject to the pressure in the brake cylinder pipe 129 and thus when fluid under pressure is supplied to the chamber 158 under the control of the magnet valve device 22 in the manner hereinafter described, spring 154 is overcome and the piston 146 shifted upwardly to unseat the valve 151 and cause the switch member 148 to engage its associated contact fingers 155. Once the valve 151 is unseated, direct communication between the brake cylinder pipe 129 and the chamber 158 is established, and thus pressure in the brake cylinder pipe acting over the larger area of the piston 146 is effective to maintain the valve 151 unseated and the switch member 148 in contact with the contact fingers 155 as long as the pressure in the brake cylinder pipe and chamber 158 exceeds a relatively low uniform pressure such as five pounds per square inch.

The upward movement of the piston 146 is limited by a projecting boss 159 on the casing surrounding the stem 147 and projecting into the chamber 152 so that the chamber 152 is always open to the atmosphere through the exhaust port 153. Thus, in the event of leakage of fluid under pressure past valve 151 when seated on its associated valve seat undesired build-up of pressure in the chamber 158 and the consequent undesired operation of the pressure switch 18 is prevented due to the dissipation of the fluid under pressure which leaked into the chamber 158 past the loose-fitting piston 146 to the atmospheric chamber 152.

Magnet valve device 22 is arranged to control the initial supply of fluid under pressure to the chamber 158 to effect operation of the pressure switch 18 from the position shown in the drawings. The magnet valve device 22 is identical in construction to the magnet valve 21 and accordingly it is deemed unnecessary to describe it in detail except to point out that corresponding parts in the two magnet valve devices are designated by the same reference numerals.

Chamber 141 of the magnet valve device 22 is connected by a branch pipe 161 to the brake cylinder pipe 129 at a point adjacent to the brake cylinder 14 and the chamber 143 of the magnet valve device 22 is not vented to atmosphere, as is the case with the chamber 143 of the magnet valve 21, but is connected as by a pipe 162 to the chamber 158 of the pressure switch 18.

It will accordingly be seen that when the electromagnet winding 137 of the magnet valve device 22 is deenergized and the valve 135 thereof correspondingly seated, the supply communication through pipes 161 and 162 to the chamber 158 of the pressure switch 18 is closed and when the electromagnet winding 137 is energized and the valve 135 correspondingly unseated, communication is opened through which fluid under pressure is supplied from the brake cylinder pipe 129 to the chamber 158 of the pressure switch 18.

Energization of the electromagnet winding 137 of magnet valve device 22 is controlled jointly by the pressure switch 19 and the switch formed by the contact shoe 68 and slip rings 69 and 71 of the rotary inertia device 11.

The pressure switch 19, as illustrated in diagrammatic form, may comprise a suitable casing containing a piston 163 that has a stem 164 carrying in insulated relation thereon a switch member 165. A coil spring 166 interposed between the casing and one side of the piston 163 urges the piston to a limit position in which the switch member 163 is out of engagement with a pair of associated contact fingers 167 fixed in insulated spaced relation on the casing. Formed in the casing at the side of the piston opposite the spring 166 is a chamber 168 which is constantly connected to the straight-air pipe 16 through a branch pipe 169.

The strength of the spring 166 is such as to yield and permit upward movement of the piston 163 to effect engagement of the switch member 165 with the contact fingers 167 when the pressure in the straight-air pipe 16 acting in chamber 168 on the piston 163 exceeds a certain uniform low pressure, such as five pounds per square inch. The operation of the contact member 165 into engagement with the contact fingers 167 is snap-acting because when the piston is initially shifted upwardly, a greater area of the piston becomes subject to the pressure in the chamber 168 and thus the piston is rapidly and suddenly shifted in response to the greater pressure force to effect engagement of the switch member 165 with contact fingers 167.

Current for energizing the magnet valve devices 21 and 22 may be supplied from any suitable source of current, such as a storage battery 171, which may be the usual storage battery for the lighting system on the car or train. The various electrical circuits whereby energization of the magnet valve devices 21 and 22 is effected will be traced later on in connection with an assumed operation of the equipment.

*Operation of equipment*

Assuming that the supply reservoir 13 is charged with fluid under pressure, as from a fluid compressor not shown, and that the car or train is traveling along the road under power, or coasting, with the brake valve handle 118 in normal release position so that the brakes are released, the operator may effect an application of the brakes by shifting the brake valve handle 118 out of its normal release position into the application zone, after first cutting off propulsion power if the power is on. The straight-air pipe 16 is accordingly charged to a pressure corresponding to the displacement of the brake valve handle 118 out of its normal release position, and fluid under pressure is supplied from the straight-air pipe 16 to the brake cylinder 14 by way of the branch pipe 118, chamber 127 of the release valve device 17 and brake cylinder pipe 129, thus effecting application of the brakes on the wheels of axle 12.

The pressure of the fluid in the straight-air pipe is effective to actuate the switch member 165 of the pressure switch 19 into contact with its associated contact fingers 167 when the pressure in the straight-air pipe exceeds the uniform low pressure of five pounds per square inch. As long as the wheels on the axle 12 do not slip in response to and due to the application of the brakes thereon, the closing of the pressure switch 19 is without effect.

If the wheels on the axle 12 begin to slip, however, due to the application of the brakes thereon, the contact shoe 68 of rotary inertia device 11 is actuated into bridging contact with the slip rings 69 and 71 to establish a circuit for energizing the magnet valve device 22. This circuit extends from one terminal of the battery 171, hereinafter called the positive terminal, through a wire 173, switch member 165 and contact fingers 167 of the pressure switch 19, wires 174 and 175, terminal post 111, strap 113, slip ring 69, contact disc 83 of the contact shoe 68, slip ring 71, strap 112, terminal post 110, wire 176, electromagnet winding 137 of the magnet valve device 122, and thence to the negative terminal of the battery 171 as through a ground connection in the manner shown.

Valve 135 of the magnet valve 22 is accordingly unseated and fluid under pressure is supplied from the brake cylinder pipe 129 through the pipes 161 and 162 to the chamber 158 of the pressure switch 18 which is accordingly operated to unseat the valve 151 and engage switch member 148 with its associated contact fingers 155. When the valve 151 is unseated, communication is established from the chamber 158 beneath the piston 146 of the pressure switch 18 through the port 156 and pipe 157 to the brake cylinder pipe 129, and brake cylinder pressure is accordingly effective in chamber 158 to thereafter maintain the valve 151 unseated and switch member 148 in engagement with contact fingers 155 as long as the pressure in the brake cylinder exceeds the uniform low pressure of five pounds per square inch.

The engagement of the switch member 148 of the pressure switch 18 with its associated contact fingers 155 completes a circuit for energizing the magnet winding 137 of the magnet valve device 21. This circuit extends from the positive terminal of battery 171 through the wire 173, switch member 165 and contact fingers 167 of the pressure switch 19, wires 174 and 175, electromagnet winding 137 of the magnet valve device 21, wire 177, contact fingers 155 and switch member 148 of the pressure switch 18, and thence to the negative terminal of the battery 171 as through a ground connection in the manner indicated.

The unseating of the valve 135 of the magnet valve device 21 as the result of the energization of the electromagnet winding 137 establishes the exhaust communication for the piston chamber 132 of the release valve device 17 and the vent valve 121 of the release valve device 17 is accordingly operated to interrupt the supply of fluid under pressure from the branch pipe 128 of the straight-air pipe 16 to the brake cylinder pipe 129 and to vent brake cylinder pipe 129 to atmosphere through the exhaust port 125.

It will accordingly be seen that almost instantaneously upon the initiation of slipping of the car wheels on the axle 12, the release valve device 17 is operated to rapidly vent fluid under pressure from the brake cylinder 14 and accordingly rapidly reduce the degree of application of the brakes.

When the degree of application of the brakes has been reduced sufficiently to cause the vehicle wheels to cease deceleration and begin to accelerate back to a speed corresponding to vehicle or rail speed, the fly-wheel 25 shifts from a leading position with respect to the axle 12 back through its normal position to a lagging position with respect to the axle 12, and in passing through its normal position with respect to the axle 12, causes the contact shoe 68 to be withdrawn momentarily from contact with the slip springs 69 and 71, thus interrupting the circuit for energizing the electromagnet winding 137 of the magnet valve device 22. However, due to the direct communication from the chamber 158 of the pressure switch 18 past the valve 151 to the brake cylinder pipe 129, the momentary deenergization of the electromagnet winding 137 of the magnet valve device 22 is without effect and consequently the pressure switch 18 remains in circuit-closing position maintaining the electromagnet winding 137 of the magnet valve device 21 energized, which in turn maintains open the exhaust communication for the piston chamber 132 of the release valve device 17.

Thus, as long as the pressure in the brake cylinder 14 and brake cylinder pipe 129 effective in chamber 158 of the pressure switch 18 past the valve 151 exceeds the low pressure of five pounds per square inch, the release valve device 17 continues to be maintained in position for continuing the venting of fluid under pressure from the brake cylinder 14.

When the wheels on the axle 12 approach closely to a speed corresponding to vehicle or rail speed, the rate of acceleration thereof reduces sufficiently to cause the fly-wheel 25 to be snapped back into its normal rotative position relative to the sleeve 26 on the axle 12, thus effecting disengagement of the contact shoe 68 from the slip rings 69 and 71. Accordingly, the circuit for energizing the electromagnet winding 137 of the magnet valve device 22 is interrupted and the valve 135 of the magnet valve 22 seated to close the supply communication therepast from the brake cylinder pipe 129 to the chamber 158 of the pressure switch 18.

The time required for the pressure in the brake cylinder 14 to reduce through the exhaust port 125 of the release valve device 17 to below five pounds per square inch is longer than the time required for the vehicle wheels to return fully to vehicle or rail speed and, accordingly, the degree of application of the brakes on the slipping wheels continues to reduce until after the vehicle wheels have returned fully to a speed corresponding to vehicle or rail speed.

When the pressure in the brake cylinder 14 and brake cylinder pipe 129 reduces below five pounds per square inch, the spring 154 of the pressure switch 18 returns the piston 146 to a position reseating the valve 151 and disengaging the switch member 148 from its associated contact fingers 155. The separation of the switch member 148 of the pressure switch 18 from its associated contact fingers 155 interrupts the circuit for energizing the electromagnet winding 137 of the magnet valve device 21 and accordingly the valve 135 of the magnet valve device 21 is immediately reseated to close the exhaust communication for the piston chamber 132 of the release valve device 17.

Being relatively small in volume, the piston chamber 132 of the release valve device 17 is promptly charged with fluid under pressure through the restricted choke 131 in the piston 123 from the straight-air pipe 16 and the spring 126 accordingly promptly shifts the piston 123 to effect reseating of the vent valve 121 to close the exhaust port 125 and reestablish the communication between the branch pipe 128 of the straight-air pipe 16 and the brake cylinder pipe 129. Accordingly, fluid under pressure is resupplied from the straight-air pipe 16 to the brake cylinder 14 to effect reapplication of the brakes on the wheels of axle 12.

Since the resupply of fluid under pressure to the brake cylinder 14 tends to reduce the pressure in the straight-air pipe 16, the brake valve 15 operates automatically to maintain the pressure in the straight-air pipe 16 corresponding to the position of the brake valve handle in its application zone. If the brake valve handle remains in its original position, the original pressure will be reestablished ultimately in the brake cylinder 14, but if it is shifted back toward its normal position, as is customary when a car or train slows down in response to the application of the brakes, the pressure reestablished in the brake cylinder and the consequent degree of application of the brakes on the vehicle wheels of axle 12 will be less than that which initiated the slipping of the wheels. Thus recurrence of slipping is unlikely.

Should the wheels again slip, however, due to the reapplication of the brakes, the above operation is repeated and in no case are the vehicle wheels permitted to decelerate to a non-rotative or locked state and slide.

When it is desired to release the brakes after the train is brought to a complete stop and prior to applying propulsion power to start the car or train, the operator returns the brake valve handle 118 to its normal release position and thus reduces the pressure in the straight-air pipe 16 to atmospheric pressure. Since the release valve device 17 is always automatically restored to its normal position connecting the brake cylinder 14 to the straight-air pipe 16, the pressure in the brake cylinder 14 will accordingly be reduced to atmospheric pressure under the control of the brake valve 15 and the brakes thereby completely released.

With the reduction of the pressure in the straight-air pipe 16 to a pressure below five pounds per square inch, switch member 165 of the pressure switch 19 is separated from its associated contact fingers 167 and, consequently, with the brakes released there can be no undesired energization of the magnet valves 21 or 22.

Summary

Summarizing, it will be seen that I have disclosed a rotary inertia device of novel construction comprising an annular fly-wheel having two portions secured together in surrounding relation to, and in supported relation on, a sleeve that is divided into two parts secured together around and in fixed relation to the axle of a car wheel-and-axle unit at a point between the wheels. The fly-wheel and the sleeve are connected through a resilient yielding connection which prevents relative rotative movement between the fly-wheel and the sleeve as long as the sleeve and the axle to which the sleeve is fixed does not accelerate or decelerate rotatively in excess of a certain rate. When the axle decelerates in excess of the rate determined by the resilient yielding connection, the fly-wheel shifts rotatively relative to the axle in a leading direction and when the axle accelerates in excess of a certain rate, the fly-wheel shifts rotatively relative to the axle in a lagging direction.

The fly-wheel carries a contact shoe which is shifted in a direction parallel to the axle upon relative rotative movement between the fly-wheel and the sleeve, in either a leading or a lagging direction, into engagement with a pair of concentrically disposed insulated slip rings which are carried by a split casing member surrounding the axle. The casing member having the slip rings thereon is held against rotation by means of a torque arm secured to a fixed part of the car truck, and the slip rings are connected respectively to different wires of an electrical circuit whereby the contact of the contact shoe therewith completes an electrical circuit.

The rotary inertia device is illustrated and described in connection with a brake control equipment for effecting instantaneous and rapid reduction in the degree of application of the brakes associated with the wheels carried by the axle with which the rotary inertia device is associated to cause the slipping wheels to cease deceleration and accelerate back to a speed corresponding to vehicle or rail speed without actually decelerating to a locked or non-rotative state and sliding. The brake control equipment is of such character as to insure and maintain the continued reduction of the degree of application of the brakes until a predetermined low degree is reached which occurs after the slipping vehicle wheels return fully to a speed corresponding to vehicle or rail speed. Upon such reduction in the degree of application being attained, the brake control equipment operates automatically to reapply the brakes.

It will be apparent that the construction and the arrangement of the rotary inertia device 11 is such as to enable installation thereof on a car wheel axle at a point between the wheels and directly associated with the axle. The rotary inertia device is relatively simple in construction and of such compact nature as to require very little space under the car where space is at a premium. Furthermore, the rotary inertia device 11 is of rugged construction so as to assure reliable operation and to require a minimum of servicing or maintenance.

It should be understood that the rotary inertia device which I have disclosed herein is adapted for other purposes than in the control of brake equipment. It should also be understood that while I have shown a specific embodiment of the rotary inertia device constituting my invention, various omissions, additions, or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. A rotary inertia device for registering the rotative condition of a rotary element, comprising an annular inertia element concentrically surrounding the rotary element, resilient means through which the rotary element drives the inertia element and adapted to yieldingly permit rotative movement of the inertia element relative to the rotary element upon variations in the rotative condition of the rotary element, a non-rotative member, and switch means carried in part on said inertia element and in part on the non-rotative member adapted to be operated in response to the relative rotative movement between the inertia element and the rotary element.

2. A rotary inertia device for registering the rotative condition of a rotary element, comprising an annular inertia element concentrically surrounding the rotary element, resilient means through which the rotary element drives the inertia element and adapted to yieldingly permit rotative movement of the inertia element relative to the rotary element upon variations in the rotative condition of the rotary element, a non-rotative member, a pair of slip rings carried by the non-rotative member in concentric relation to the rotary element, and a contact member carried by the inertia element adapted to be shifted into contact with both said slip rings upon relative rotative movement between the inertia element and the rotary element.

3. A rotary inertia device for registering the rotative condition of a rotary element, comprising a sleeve member adapted to be fixed to the rotary element in concentric relation thereto, an annular inertia element adapted to concentrically surround and be rotatively supported on said sleeve member, means providing a resilient yielding connection between the sleeve member and the inertia element adapted to hold said sleeve member and inertia element normally in a certain position with respect to each other and to yieldingly permit relative rotative movement between the inertia element and the sleeve member only when the rate of rotative deceleration or acceleration of the rotary element exceeds a certain rate, a non-rotative member concentrically surrounding the sleeve member, and switch means carried in part on the inertia element and in part on the non-rotative member adapted to be operated in response to relative rotative movement between the inertia element and the sleeve member.

4. A rotary inertia device for registering the rotative condition of a rotary element, comprising a sleeve member adapted to be fixed to the rotary element in concentric relation thereto, an annular inertia element adapted to concentrically surround and be rotatively supported on said sleeve member, means providing a resilient yielding connection between the sleeve member and the inertia element adapted to hold said sleeve member and inertia element normally in a certain position with respect to each other and to yieldingly permit relative rotative movement between the inertia element and the sleeve member only when the rate of rotative deceleration or acceleration of the rotary element exceeds a certain rate, a non-rotative member concentrically surrounding the sleeve member, a pair of slip rings carried by the non-rotative member in concentric relation to the sleeve member, and a member carried by the inertia element adapted to be shifted into contact with both said slip rings upon relative rotative movement between the inertia element and the sleeve member.

5. A rotary inertia device for registering the rotative condition of a rotary element, comprising an annular inertia element having two portions secured together in concentric surrounding relation to the rotary element, means providing a resilient driving connection between the rotary element and the inertia element adapted to yieldingly permit relative rotative movement between the inertia element and the rotary element out of a normal position thereof only when the rotative deceleration or acceleration of the rotary element exceeds a certain rate, a non-rotative annular member having two portions secured together in surrounding relation to the rotary element, and switch means carried in part on the inertia element and in part on the non-rotative member adapted to be operated in response to relative rotative movement between the inertia element and the rotary element.

6. A rotary inertia device for registering the rotative condition of a rotary element, comprising an annular inertia element having two portions secured together in concentric surrounding relation to the rotary element, means providing a resilient driving connection between the rotary element and the inertia element adapted to yieldingly permit relative rotative movement between the inertia element and the rotary element out of a normal position thereof only when the rotative deceleration or acceleration of the rotary element exceeds a certain rate, a non-rotative annular member having two portions secured together in surrounding relation to the rotary element, a plurality of slip rings carried by the non-rotative member, each of said slip rings having two portions carried respectively by the two portions of the non-rotative member, and a member carried by the inertia element adapted to be shifted into contact with said slip rings upon relative rotative movement between the inertia element and the rotary element.

7. A rotary inertia device for registering the rotative condition of a rotary element, comprising a sleeve member having two portions adapted to be secured together in concentric fixed relation to said rotary element, an annular inertia element having two portions adapted to be secured together in concentric surrounding relation to the said sleeve member, means providing a resilient connection between the sleeve member and the inertia element adapted to yieldingly permit relative rotative movement between the sleeve member and the inertia element only when the decelerative and accelerative rate of the rotary element exceeds a certain rate, an annular non-rotative member having two portions adapted to be secured together in surrounding relation to the said sleeve member, and switch means carried in part on said inertia element and in part on the non-rotative member adapted to be operated in response to relative rotative movement between the inertia element and the sleeve member.

8. A rotary inertia device for registering the rotative condition of a rotary element, comprising a sleeve member having two portions adapted to be secured together in concentric fixed relation to said rotary element, an annular inertia element having two portions adapted to be secured together in concentric surrounding relation to the said sleeve member, means providing a resilient connection between the sleeve member and the inertia element adapted to yieldingly permit relative rotative movement between the sleeve member and the inertia element only when the decelerative and accelerative rate of the rotary element exceeds a certain rate, an annular non-rotative member having two portions adapted to be secured together in surrounding relation to the said sleeve member, a plurality of slip rings carried by the non-rotative member, each of said rings having two portions carried respectively by the two portions of the non-rotative member, and a member carried by the inertia element adapted to be shifted into contact with said slip rings upon relative rotative movement between the inertia element and the sleeve member.

9. A rotary inertia device for registering the rotative condition of a rotary element, comprising a sleeve member fixed to the rotary element in concentric relation thereto and having a radially extending flange provided with a cam surface, an annular inertia element disposed in concentric surrounding relation to and supported rotatively on said sleeve member, a non-rotative member, a plurality of slip rings carried in insulated relation by the non-rotative member and disposed in concentric relation to the rotary element, an element cooperative with the cam surface on the flange of the sleeve member and arranged to be shifted out of a normal position upon relative rotative movement between the inertia element and the sleeve member, and a contact member adapted to be moved into contact with said slip rings when the said element is shifted out of its normal position.

10. A control device for a vehicle having a wheel truck including a pair of wheels fixed in spaced relation to an axle, comprising a sleeve member having two portions adapted to be secured together in fixed and concentric relation with respect to the axle at a point between the wheels, an annular inertia member having two portions adapted to be secured together in concentric surrounding relation with respect to the sleeve member, means providing a resilient connection between the sleeve member and the inertia element for holding the inertia element and sleeve member in a normal position with respect to each other upon rotation of the axle and adapted to yieldingly permit relative rotative movement between the sleeve member and inertia element only when the axle decelerates rotatively or accelerates rotatively at a rate exceeding a certain rate, an annular member having two portions adapted to be secured together in concentric surrounding relation to the sleeve member and cooperating with the vehicle truck frame to prevent rotation thereof, and switch means carried in part by the inertia element and in part by the non-rotative annular member operative in response to relative rotative movement between the inertia element and the sleeve member.

11. A control device for a vehicle having a wheel truck including a pair of wheels fixed in spaced relation to an axle, comprising a sleeve member having two portions adapted to be secured together in fixed and concentric relation with respect to the axle at a point between the wheels, an annular inertia member having two portions adapted to be secured together in concentric surrounding relation with respect to the sleeve member, means providing a resilient connection between the sleeve member and the inertia element for holding the inertia element and sleeve member in a normal position with respect to each other upon rotation of the axle and adapted to yieldingly permit relative rotative movement between the sleeve member and inertia element only when the axle decelerates rotatively or accelerates rotatively at a rate exceeding a certain rate, an annular member having two portions adapted to be secured together in concentric surrounding relation to the sleeve member and cooperating with the vehicle truck frame to prevent rotation thereof, a plurality of slip rings carried by the non-rotative member in concentric relation to the sleeve member, and a contact member carried by the inertia element and actuated into contacting relation with said slip rings in response to relative rotative movement between the inertia element and the sleeve member.

CLYDE C. FARMER.